US012642184B2

(12) United States Patent
Shonk et al.

(10) Patent No.: US 12,642,184 B2
(45) Date of Patent: Jun. 2, 2026

(54) AGRICULTURAL SYSTEM FOR BALE APPEARANCE ASSESSMENT

(71) Applicant: CNH Industrial America LLC, New Holland, PA (US)

(72) Inventors: Jason L. Shonk, Lancaster, PA (US); Terry S. Moyer, Denver, PA (US); Nathan R. Drzal, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 224 days.

(21) Appl. No.: 18/196,030

(22) Filed: May 11, 2023

(65) Prior Publication Data

US 2023/0363317 A1 Nov. 16, 2023

Related U.S. Application Data

(60) Provisional application No. 63/340,606, filed on May 11, 2022.

(51) Int. Cl.
A01F 15/08 (2006.01)

(52) U.S. Cl.
CPC ...... A01F 15/0825 (2013.01); A01F 15/0841 (2013.01)

(58) Field of Classification Search
CPC ... A01F 15/08; A01F 15/0825; A01F 15/0841
See application file for complete search history.

(56) References Cited

U.S. PATENT DOCUMENTS

| 11,205,337 B1 * | 12/2021 | Derscheid | A01F 15/08 |
| 2017/0270686 A1 | 9/2017 | Couch | |
| 2017/0287303 A1 * | 10/2017 | Lang | G08B 21/0275 |
| 2019/0265043 A1 | 8/2019 | Lang et al. | |
| 2020/0193561 A1 | 6/2020 | Leordeanu et al. | |

FOREIGN PATENT DOCUMENTS

| AU | 2010202940 A1 * | 2/2011 | A01F 15/0825 |
| EP | 0978231 A1 * | 2/2000 | A01F 15/141 |
| EP | 3228180 B1 | 9/2019 | |

* cited by examiner

*Primary Examiner* — Jimmy T Nguyen
(74) *Attorney, Agent, or Firm* — Buchanan Ingersoll & Rooney PC

(57) ABSTRACT

An agricultural system includes: a frame; a control system operatively coupled with the frame, the control system including: at least one sensor configured for: detecting remotely at least one operative condition of a bale of a crop material after the bale has been ejected from a bale chamber of a baler; outputting at least one operative condition signal corresponding to the at least one operative condition; a controller system operatively coupled with the at least one sensor and configured for: receiving the at least one operative condition signal; determining at least one operative parameter based at least in part on the at least one operative condition signal, the at least one operative parameter being associated with a performance of the baler.

17 Claims, 5 Drawing Sheets

660

661 — Providing the agricultural system

662 — Detecting an operative condition of a bale

663 — Outputting an operative condition signal

664 — Receiving the operative condition signal

665 — Determining an operative parameter

AGRICULTURAL SYSTEM FOR BALE APPEARANCE ASSESSMENT

FIELD OF THE INVENTION

The present invention pertains to an agricultural system, and, more specifically, to an agricultural control system.

BACKGROUND OF THE INVENTION

Agricultural harvesting machines, such as agricultural balers (which can be referred to balers), have been used to consolidate and package crop material (which, depending upon the application, can also be referred to as forage, forage material, or forage crop material) so as to facilitate the storage and handling of the crop material for later use. Often, a mower-conditioner cuts and conditions the crop material for swath or windrow drying in the sun. When the cut crop material is properly dried (depending upon the application), an agricultural harvesting machine, such as an agricultural baler, which can be a round baler or a square baler, travels along the swaths or windrows (hereinafter, collectively referred to as windrows, unless otherwise specified) to pick up the crop material. In the case of round balers, the crop material is formed into cylindrically-shaped round bales, and in the case of square balers, the crop material is formed into small or large square bales. More specifically, pickups of the baler gather the cut and windrowed crop material from the ground, and then convey the cut crop material into a bale-forming chamber within the baler. A drive mechanism operates to activate any pickups, augers, and/or a rotor of a feed mechanism. For a round baler, for instance, a conventional baling chamber may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. A cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

Measured data on bale size and shape of bales previously ejected from the baler is commonly asked by engineers for field test reports. This request encompasses both round and square bales and is related to the quality of the bales produced for sale. The assessment judges if the bale produced by the baler fits within a subjective nominal range for roundness or squareness to meet customer acceptability. To assess the baler's performance, a large sample population of the measured data of the bales is needed to develop a statistical conclusion. A known method for obtaining this measured data is to obtain it manually, that is, to physically measure bales, for example, lying in a field. Such manual measurements can be obtained by using a tape measure to measure the bales, or by using a mechanism having a pre-defined shape (such as a square, for square bales) with pre-defined dimensions. The time to physically measure bales lying in a field, however, can approach the time it takes to create the bales, which is not efficient for a test engineer.

Rather than physically measuring the bales, an alternative is to conduct a visual overview of the bales lying in the field, which can identify gross non-conformance of bales, but a precise distribution is not possible without measured data.

In general, application software is known which can measure distances electronically via a handheld device. Such a device is a smart phone and can include a sensor formed as a camera.

What is needed in the art is a way to measure dimensions remotely of bales after they have been ejected from a baler and to use this data to assess the bales and baler performance.

SUMMARY OF THE INVENTION

The present invention provides an agricultural system to measure dimensions remotely of bales after they have been ejected from a baler and to use this data to assess the bales and baler performance.

The invention in one form is directed to a control system of an agricultural system, the agricultural system including a frame, the control system being operatively coupled with the frame, the control system including: at least one sensor configured for: detecting remotely at least one operative condition of a bale of a crop material after the bale has been ejected from a bale chamber of a baler; outputting at least one operative condition signal corresponding to the at least one operative condition; a controller system operatively coupled with the at least one sensor and configured for: receiving the at least one operative condition signal; determining at least one operative parameter based at least in part on the at least one operative condition signal, the at least one operative parameter being associated with a performance of the baler.

The invention in another form is directed to an agricultural system, including: a frame; a control system operatively coupled with the frame, the control system including: at least one sensor configured for: detecting remotely at least one operative condition of a bale of a crop material after the bale has been ejected from a bale chamber of a baler; outputting at least one operative condition signal corresponding to the at least one operative condition; a controller system operatively coupled with the at least one sensor and configured for: receiving the at least one operative condition signal; determining at least one operative parameter based at least in part on the at least one operative condition signal, the at least one operative parameter being associated with a performance of the baler.

The invention in yet another form is directed to a method of using an agricultural system, the method including the steps of: providing that the agricultural system includes a frame and a control system operatively coupled with the frame, the control system including at least one sensor and a controller system operatively coupled with the at least one sensor; detecting remotely, by the at least one sensor, at least one operative condition of a bale of a crop material after the bale has been ejected from a bale chamber of a baler; outputting, by the at least one sensor, at least one operative condition signal corresponding to the at least one operative condition; receiving, by the controller system, the at least one operative condition signal; and determining, by the controller system, at least one operative parameter based at least in part on the at least one operative condition signal, the at least one operative parameter being associated with a performance of the baler.

An advantage of the present invention is that it provides an electronic measuring tool for measuring the size of bales remotely after they have been ejected from the baler.

Another advantage of the present invention is that it provides a way to make a baler appearance assessment automatically and thus to perform data analysis to assess bale conformity to a predetermined standard.

Yet another advantage of the present invention is that it provides a device for conducting the measurements and for analyzing the data, the device optionally being a handheld device, or a device that is attached to an agricultural machine, such as a tractor or a baler. Further, such data can be integrated into a crop data collection portfolio for a user, together with yield and/or moisture measurements. Field data can thus be collected and shared with others.

Yet another advantage of the present invention is that it provides for time savings, a large sample size data collection with relative ease and efficiency, statistical analysis, performance assessment, and variable rate selling of bales based upon bale appearance.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 5:
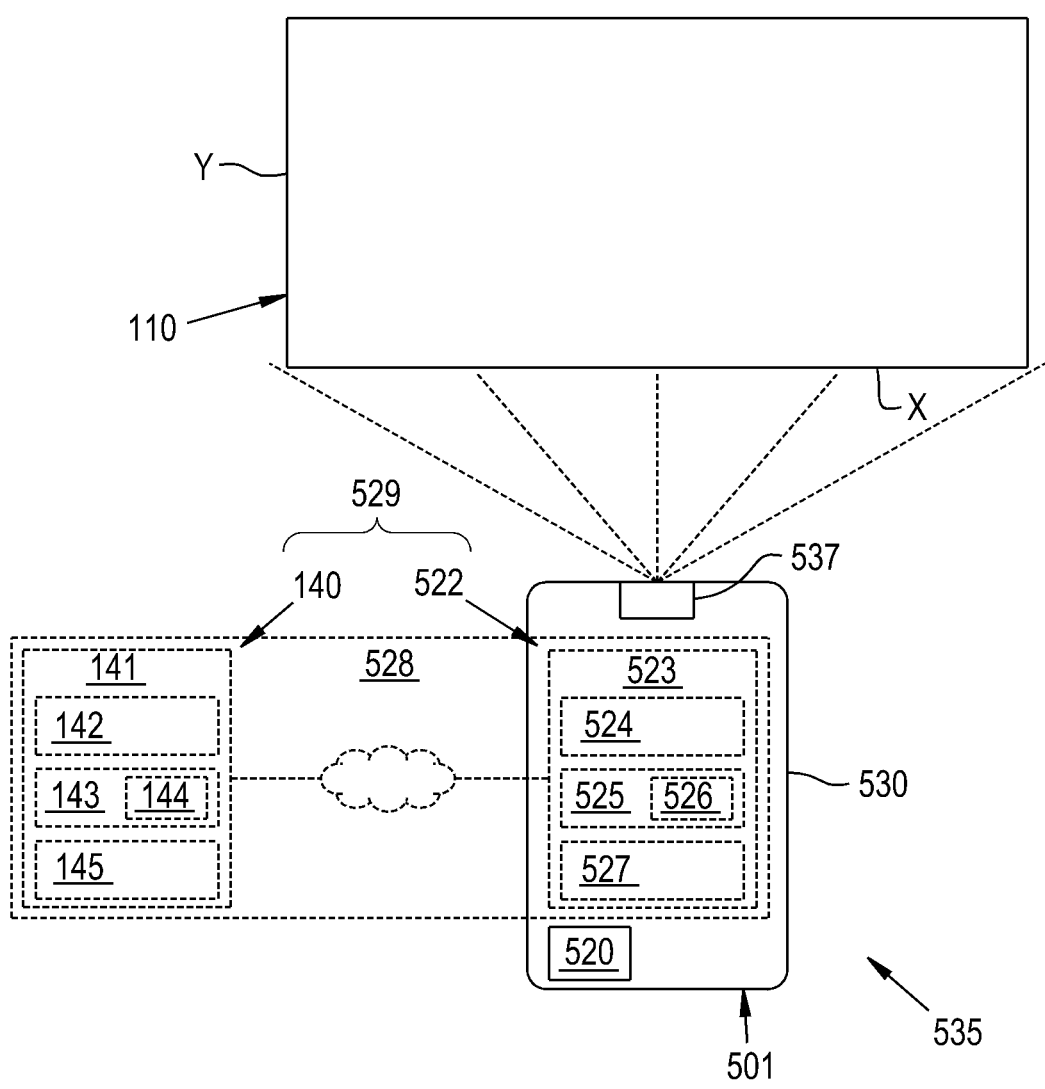
FIG. 5 illustrates a top view of another exemplary embodiment an agricultural system, in accordance with an exemplary embodiment of the present invention.

According to the present invention, an agricultural system includes: a frame; a control system operatively coupled with the frame, the control system including: at least one sensor; and a controller system operatively coupled with the at least one sensor. The agricultural system can be embodied as a variety of different types of systems. For example, the agricultural system can be or include a mobile system, such as an agricultural vehicle system, which can be a wheeled system, a tracked system, or a combination thereof, and can be operator controlled (either with the operator on board or remotely) or autonomous. Such a vehicle system can be any such vehicle system, such as a tractor and a baler which is pulled by the tractor, which is discussed below (FIGS. 1-2), or a self-loading forage wagon. Alternatively, the agricultural system can be or include a handheld device that includes the frame and, in whole or in part, the control system. Such a handheld device is discussed below (FIG. 5). Further, the controller system of the agricultural system can be a single controller or a plurality of controllers.

Figure 1:
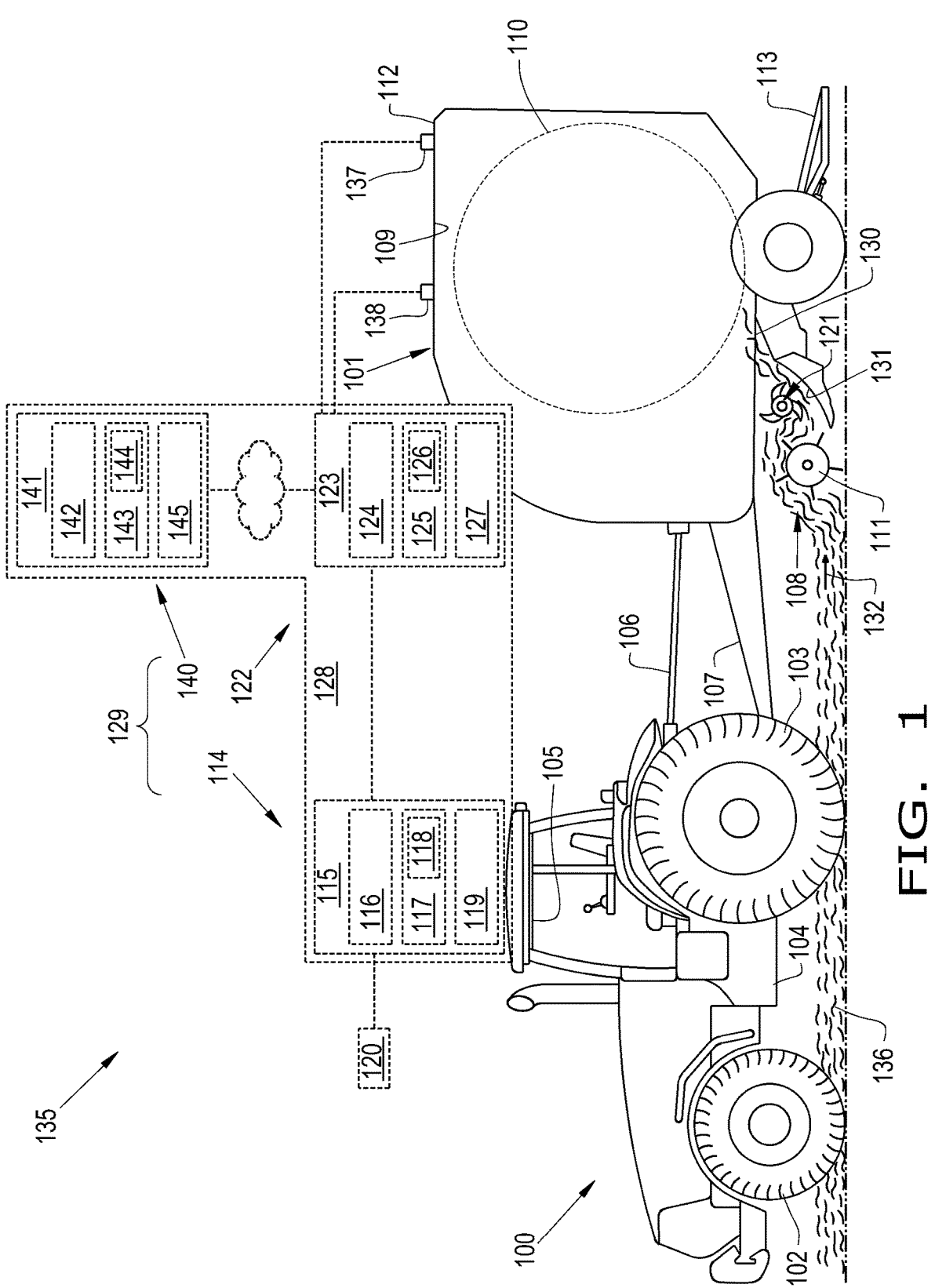
FIG. 1 illustrates a side view of an exemplary embodiment of an agricultural system including an agricultural vehicle, formed as a tractor, and an agricultural baler, the agricultural system including a control system, in accordance with an exemplary embodiment of the present invention.

Referring now to the drawings, and more particularly to FIG. 1, there is shown an embodiment of an agricultural system 135 (which, in this embodiment, can be referred to as an agricultural machine system 135 or an agricultural vehicle system 135) including an agricultural work vehicle 100 (which can be referred to as a work vehicle, or an agricultural vehicle) and an agricultural machine 101 (which can be referred to as an agricultural implement, or an implement), which is being towed by, and thus coupled with, agricultural work vehicle 100, in accordance with the present invention, to perform an agricultural operation within a field. As shown, work vehicle 100 can be configured as an agricultural tractor, and agricultural machine 101 can be configured as a baler 101, such as a round baler 101, in accordance with an exemplary embodiment of the present invention, tractor 100 pulling baler 101 to perform a baling operation within the field (in this case, agricultural machine system 135 is an agricultural baler system 135). Further, agricultural machine system 135 includes a control system 129 (which can be referred to as a unified control system 129). Unified control system 129 includes control system 114 of tractor 100, control system 122 of baler 101, and, optionally, control system 140 of a data center that is cloud-based, Internet-based, and/or remotely located. Control system 114 includes controller 115, control system 122 includes controller 123, and control system 140 includes controller 141. Further, unified system 129 can be said to include controller system 128, which includes controllers 115, 123, 141. Control systems 114, 122, and 140 are operatively coupled with one another; though FIG. 1 shows only control system 122 being directly connected with control system 140, it can be appreciated that control system 114 is directly connected with control system 140 as well (an assumed line directly connects control systems 114, 140). Considering that control system 129 is operatively coupled with frames 104, 130, control system 140 is also operatively coupled with frames 104, 130, even though remotely located from frames 104, 130, given the physical connections of controllers 115, 123 and sensors 137, 138 with frames 104, 130, respectively. Control system 114, in whole or in part, is further included as part of work vehicle 100, and control system 122, in whole or in part, is further included as part of baler 101.

Work vehicle 100 can be an operator-driven tractor or an autonomous tractor. However, in some embodiments, work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales (alternatively, though not shown, the baler can be a square baler, configured to generate small or large square bales). It should be further appreciated that baler 101, while shown as being towed by tractor 100, may also be a self-propelled baler that does not rely on a separate vehicle for propulsion and/or power to function.

Work vehicle 100 includes a pair of front wheels 102, a pair of rear wheels 103, and a chassis 104 (which can also be referred to as a work vehicle frame 104) coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly. Control system 114, in whole or in part, can be coupled with frame 104.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system 108 (which can be referred to generally as a crop collector) mounted on a front end of baler 101. Feeder system 108 may, for example, include a pickup assembly 111, a rotor and auger arrangement 121, and a floor 131. Pickup assembly 111 includes a rotating wheel with tines that collect crop material 136 from the ground and direct crop material 136 toward a bale chamber 109 of baler 101 in an overshot manner (rotating clockwise in FIG. 1), as is known. Rotor and auger arrangement 121 is configured to push or otherwise to move crop material 136 towards or into bale chamber 109, in an undershot manner, as is known. FIG. 1 shows crop material 136 lying in a windrow on the ground of the field and being picked up by pickup assembly 111. Upon being picked up, crop material 136 flows over pickup assembly 111 and ultimately under rotor and auger arrangement 121, as indicated by arrow 132, which indicates the normal flow direction 132 of crop material 136 relative to feeder system 108. FIG. 1 shows baler 101 schematically and thus with one pair of wheels, though it can be appreciated that baler 101 can include one or more additional pair of wheels, as in FIG. 2.

Inside bale chamber 109, rollers, belts, and/or other devices compact the crop material 136 to form a generally cylindrically-shaped bale 110 for round balers (reference numeral 110 herein is generic to both round bales and square bales (or any other shaped bale)—even though in FIG. 1 the bale shown and described is a round bale—with the result that 110 can refer to either round or square bales). Bale 110 is contained within baler 101 until ejection of bale 110 is instructed (e.g., by the operator and/or baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes control system 114, which includes controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes control system 122, which includes controller 123, which includes a processor 124, memory 125, data 126, and instructions 127. Controller 123 can communicate with controllers 115, 141, so that controller 115 outputs information to the display of input/output device 120 of work vehicle 100, thereby informing a user of various conditions of baler 101 and bales 110 forming or formed therein. Further, baler 101 includes a frame 130 (which can be referred to as baler frame 130, or more generally as a machine frame 130) to which all of the components of baler 101 are directly or indirectly coupled. Thus, feeder system 108 and thus also pickup assembly 111 and rotor and auger arrangement 121 are coupled with frame 130. Control system 122, in whole or in part, can be coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration, or other agricultural machines, such as a vehicle and/or implement, as indicated above. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123, 141 may each correspond to any suitable processor-based device(s), such as a computing device or any combination of computing devices. Each controller 115, 123, 141 may generally include one or more processor(s) 116, 124, 142 and associated memory 117, 125, 143 configured to perform a variety of computer-implemented functions (e.g., performing the methods, steps, algorithms, calculations and the like disclosed herein). Thus, each controller 115, 123, 141 may include a respective processor 116, 124, 142 therein, as well as associated memory 117, 125, 143, data 118, 126, 144, and instructions 119, 127, 145, each forming at least part of the respective controller 115, 123, 141. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125, 143 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125, 143 may generally be configured to store information accessible to the processor(s) 116, 124, 142 including data 118, 126, 144 that can be retrieved, manipulated, created, and/or stored by the processor(s) 116, 124, 142 and the instructions 119, 127, 145 that can be executed by the processor(s) 116, 124, 142. In some embodiments, data 118, 126, 144 may be stored in one or more databases.

Tractor controller 115, herein, is assumed to be the primary controller for controlling operations of tractor 100, and baler controller 123, herein, is assumed to be the primary controller for controlling operations of baler 101, though it is understood that at different times each of controllers 115, 123, 141 can control any of the other of the controllers 115, 123, 141. Controllers 115, 123, 141 as indicated in FIG. 1, can be in communication with the other of controllers 115, 123, 141 thereby forming unified control system 129, such that any or all information associated with any controller 115, 123, 141 can be shared with the other of controllers 115, 123, 141, and any controller 115, 123, 141 can perform the functions of the other controllers 115, 123, 141. Controllers 115, 123, 141 can communicate with each other in any suitable manner, such as a wired connection or a wireless connection, such as radio signals (RF), light signals, cellular, WiFi, Bluetooth, Internet, via cloud-based devices such as servers, and/or the like. Controllers 115, 123, 141 can be configured to perform any of the functions of any of the other controllers 115, 123, 141. Controllers 115, 123, 141 can be a part of any network facilitating such communication therebetween, such as a local area network, a metropolitan area network, a wide area network, a neural network, whether wired or wireless. Control system 129, and controller system 128, are operatively coupled with tractor 100 and baler 101, in particular with frames 104, 130. According to an embodiment of the present invention, tractor controller 115 can issue commands to baler controller 123. This is assumed to be the case herein, unless otherwise stated. According to an alternative embodiment of the present invention, baler controller 123 can issue commands to tractor controller 115 (such as for ISOBUS III or higher implements and/or vehicles). This is assumed to be the case herein, unless otherwise stated.

Control system 129 can include additional sensors or other inputs. Control system 114 can further include a GPS (not shown) mounted on tractor 100 (the tractor GPS). The tractor GPS senses the location of tractor 100 within the field, as is known, and this data can be provided to controller 115, 123. Similarly, control system 122 can further include a GPS (not shown) mounted on baler 101 (the baler GPS). The baler GPS senses the location of baler 101 within the field, as is known, and this data can be provided to controller 115, 123. Further, the operator, by way of device 120, can input or make certain settings. Control system 129 can further include any number additional control systems (with their individual controllers, processors, memory, data, and instructions, substantially similar to what is described above with reference to control systems 114, 122, 140), and any such control system can have input/output devices as a part thereof and/or connected thereto.

Figure 2:
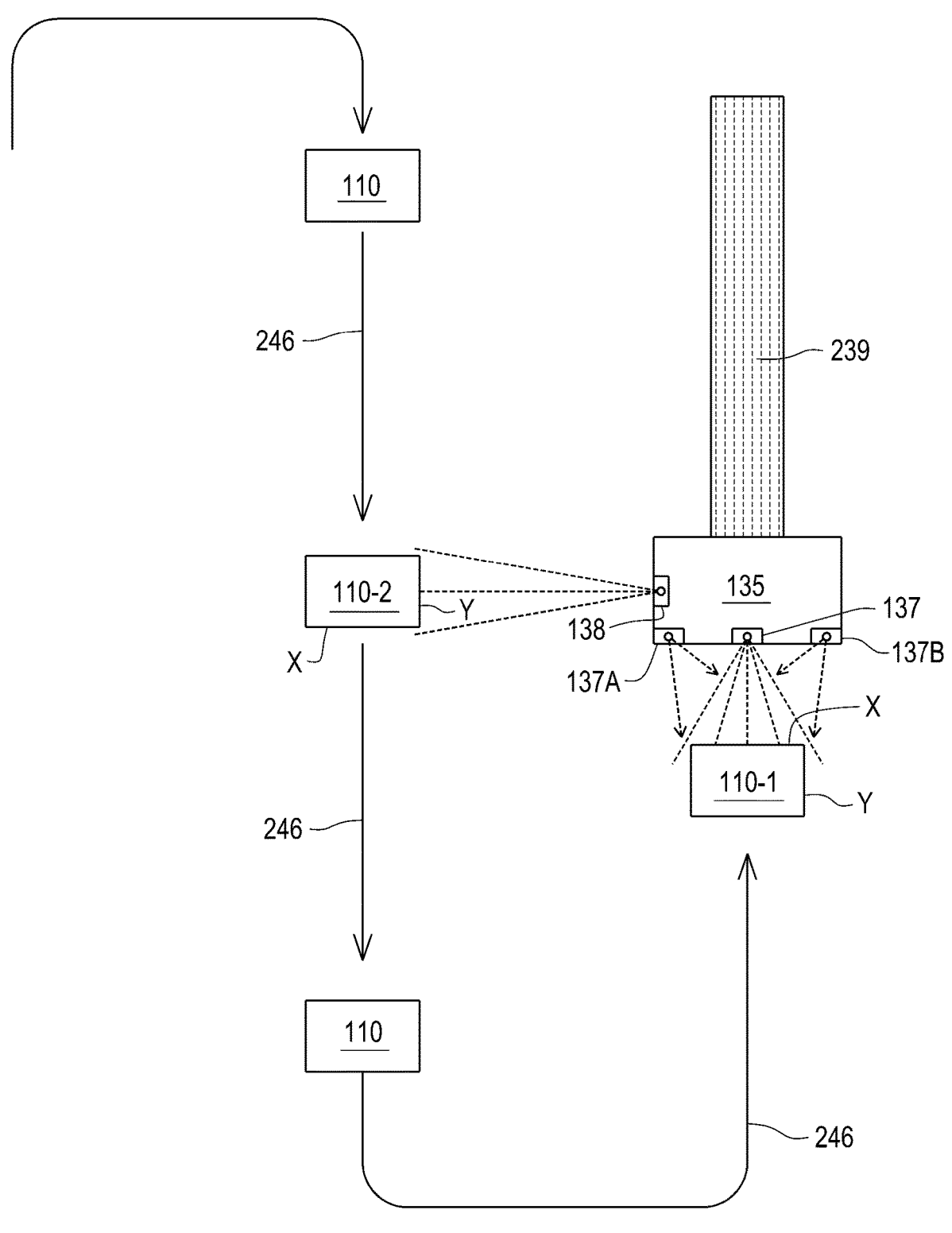
FIG. 2 illustrates schematically a top view of a field of crop material, with the tractor and baler baling rows of crop material in the field, in accordance with an exemplary embodiment of the present invention.

Control system 123 further includes at least one sensor 137 and, optionally, at least one sensor 138. Each sensor 137, 138 is coupled with frame 130 and is thus a part of baler 101. Alternatively or in addition thereto, at least one sensor 138 can be coupled with frame 104 (in any suitable location, so as to be able to observe bales 110 in a field out to a lateral side of tractor 100) and thus be a part of tractor 100; the discussion that follows, however, assumes that all sensors 138 are coupled with frame 130, unless stated otherwise. Each sensor 137, 138 sis operatively coupled with controller 123, 115. Each sensor 137, 138 is configured for: (a) detecting remotely (that is, not in contact with a bale) at least one operative condition of a bale 110 of crop material 136 after the bale 110 has been ejected from bale chamber 109 of baler 101; and (b) outputting at least one operative condition signal corresponding to the at least one operative condition. Regarding (a), each sensor 137, 138 detects a bale 110 that is finished and outside of baler 101, for example, a bale 110 that is lying on the ground (FIG. 2). The operative conditions are associated with the appearance of a respective bale 110 and include at least one bale dimension and, optionally a bale shape. For example, for round bales 110, the operative conditions can include a diameter of bale 110, as well as a width and height of the bale 110, and such dimensions can be used to ascertain a shape of the bale 110 (discussed further below). For square bales 110, the operative conditions can include a width and height of bale 110 along an endface and a width and height of bale 110 along a long side of the bale 110, and such dimensions can be used to ascertain a shape of the bale 110 (discussed further below). Sensor 137 can be configured to sense the bale 110 shortly after it has ejected from baler 101, before and/or after the bale 110 has come to rest on the ground, while baler 101 is still at rest and/or after it has started to move away from the bale 110 that is has just ejected. Thus, sensor 137 can be a rearwardly facing and can be positioned in any suitable location on frame 130, such as (by way of example and not limitation) a rear portion of an outside skin of baler 101, such as on a top wall. Sensor 138 can be configured to sense the bale 110 after it has ejected from baler 101 and when baler 101 is to a lateral end of the bale 110. Thus, sensor 138 can be laterally facing and can be positioned in any suitable location on frame 130, such as (by way of example and not limitation) a lateral side portion of an outside skin of baler 101, such as on a top wall. Thus, each sensor 137, 138 can be positioned on frame 130 in any suitable location, such as in any place where sensors 137, 138 have a clear line of sight of the bale 110. Sensors 137, 138 can be configured for sensing whatever is in a field of view of sensors 137, 138 and thus can be any suitable sensor. Sensors 137, 138 can be an optical or visual sensor, such as a camera, a lidar sensor, and/or a radar sensor (which can be deemed to be a kind of image or optical sensor herein). Sensors 137, 138 can employ a plurality of such different types of sensors. By way of such sensing, sensors 137, 138 can generate images corresponding to what is sensed with respect to bales 110. Sensors 137, 138 are each configured for outputting an image signal corresponding to the images sensed by sensors 137, 138 to controller 123. These images can be taken continuously by sensors 137, 138 and can be associated with one or more operative conditions employed by controllers 115, 123, as discussed above. The primary focus of the visual field of sensors 137, 138 is primarily the bales 110. The images sensed by sensors 137, 138 can be processed by sensors 137, 138, by controller 115, 123, and/or by an off-site controller associated with control system 129. It is assumed herein, unless stated otherwise, that the images from sensors 137 are processed by controller 123. The images sensed by sensors 137, 138, in particular of the bales 110 of crop material 136, include at least one of the operative conditions used by controller 123 for further outputs. Alternatively or in addition thereto, sensors 137, 138, and/or additional sensors (not shown), can be bale shape sensors, which can be focused on, alternatively or in addition to the dimensions sensed above, to detecting a bale shape of each bale 110, which can be an operative condition sensed by sensor 137, 138, and/or another sensor(s). Regarding (b), the at least one operative condition signal is output to controller 123. Though two sensors 137, 138 are discussed herein, alternatively a single sensor can be employed that can be configured to perform the functions of sensors 137, 138. Further, a device (such as a Telemaco) can be used that can collect and record data from sensors 137, 138 and can transmit such data wirelessly relative to controller system 128 and device 120, for example.

Referring now to FIG. 2, there is shown schematically a top view of a field of crop material 136 disposed in bales 110 and windrows 239. Agricultural machine system 135 (including tractor 100 and baler 101) is traversing the field, forming the windrows 239 into bales 110, machine system 135 moving through the field in the direction of arrows 246 showing the direction of travel 246. Two rows of crop material 136 are shown in FIG. 2, a left row and a right row. System 136 has already baled the crop material in the left row into bales 110 (three such bales 110) and is in the midst of baling the crop material of the right row. As shown in FIG. 2, system 135 has just completed ejecting bale 110-1. Typically, when baler 101 ejects a bale 110, baler 101 has halted from traversing the ground, and remains halted until the tailgate of baler 101 is closed, upon which tractor 100 and baler 101 proceed forward again in direction 246. During this time in which bale 110 has been ejected and the tailgate can be closing (which can last some seconds, such as 5-10 seconds), sensor 137 can visually scan bale 110-1, obtaining any operative conditions of bale 110-1, such as the width 348 and/or height 349 (for a round bale, FIG. 3) or the width 452 and height 453 (for a square bale, FIG. 4) of bale 110-1, on side X of bale 110-1. While this measurement can be taken by sensor 137 while baler 101 is halted, alternatively or in addition thereto this measurement can be taken as system 135 is driving away from bale 110-1. Further, as system 135 is baling an adjacent row of crop material 136 as shown in FIG. 2 (or any other subsequent row of crop material 136), sensor 138 can obtain additional operative parameter(s) of bales 110 that have already been completed and are lying on the ground, such as bale 110-2. Such an operative condition can be the diameter 347 (for a round bale, FIG. 3), or the width 450 and height 451 (for a square bale, FIG. 4) of bale 110-2, on side Y of bale 110-2. Sensor 138 can take its measurement while system 135 is halted or moving and at the same time or at different times as when sensor 137 is taking its measurements. With respect to bale 110-2, system 135 has already obtained the aforedescribed dimensions of side X of bale 110-2. However, with respect to bale 110-1, system 135 has not yet obtained the aforedescribed dimensions side Y of bale 110-1 but will do so during harvest of a subsequent row of crop material 136, such as the next adjacent row to the right of the row in which system 135 is currently located.

Figure 3:
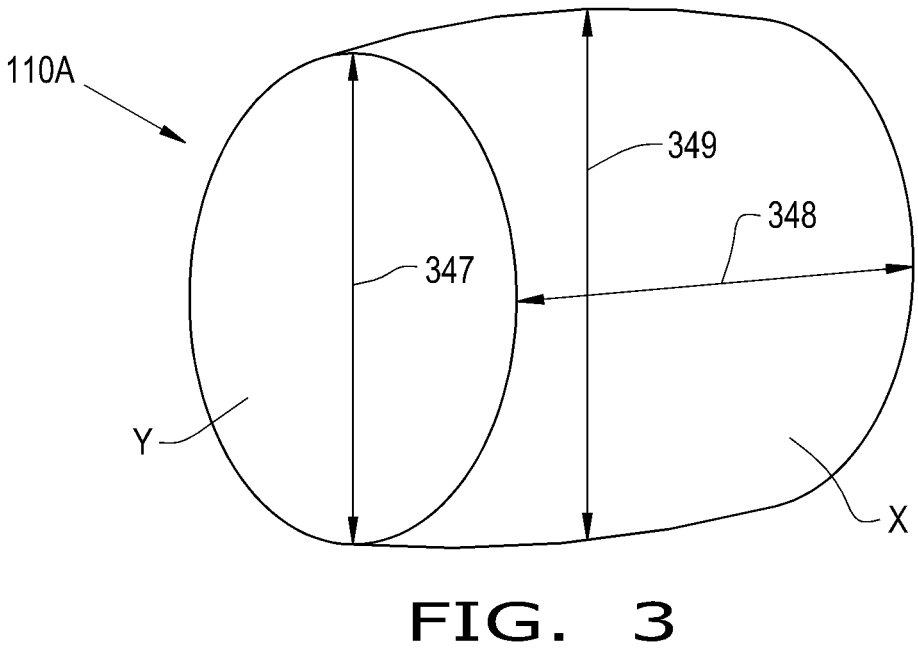
FIG. 3 illustrates a perspective view of a round bale of the crop material.

Referring now to FIG. 3, there is shown a perspective view of a round bale 110, specifically labeled as 110A for a round bale 110. Round bale 110A includes sides X and Y, as well as diameter 347 on side Y, and width 348 and height 349 on side X. A single such measurement of each of 347, 348, 349 can be taken at predetermined locations (such as vertically for 347, in the approximate vertical middle of side X for width 348, and in the approximate horizontal middle of side X for height 349). Alternatively or in addition thereto, in order to have more precise all-around measurements and thus to have a more precise bale shape, a plurality of measurements for each of 347, 348, and 349 can be taken at predetermined intervals. For instance, with respect to diameter 347 a measurement of diameter can be taken at intervals every five or ten degrees, and with respect to each of width 348 and height 349 a respective measurement of width or height can be taken at intervals of every six inches. These intervals can vary from the numbers stated here. Whether a single or a plurality of measurements and at what intervals can be set by the operator prior to taking measurements, such as by way of input/output device 120. Such measurements need to be taken to know the precise dimensions and thus shape of a given bale 1110. For instance, the bale 110A shown in FIG. 3 has what can be described as a slight barrel shape, such that the height is greater in side X than at lateral ends of bale 110A. Other such deformities from an ideal cylindrical shape can include a side Y that is not perfectly circular, but has, for example, a flat section in a top left quadrant of side Y. Further, rather than having a perfect rectangular shape on side X, bale 110A may be higher on the left than in the center or right side, or vice versa.

Figure 4:
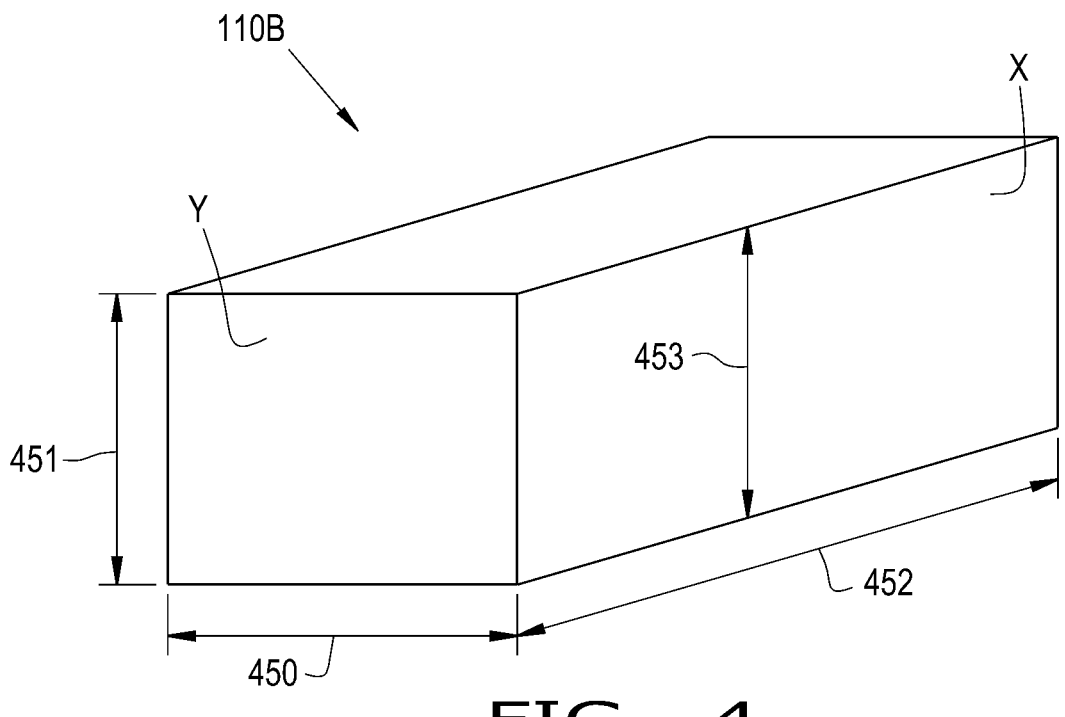
FIG. 4 illustrates a perspective view of a square bale of the crop material.

Referring now to FIG. 4, there is shown a perspective view of a square bale 110, specifically labeled as 110B for a square bale 110. Square bale 110B includes sides X and Y, as well as width 450 and height 451 on side Y and width 452 and height 453 on side X. As described with respect to round bale 110A, a single such measurement of each of 450, 451, 452, 453 can be taken at predetermined locations (such as at an approximate middle for each of 450, 451, 452, 453), or at a plurality of locations at predetermined intervals across each of 450, 451, 452, 453. Whether a single or a plurality of measurements and at what intervals can be set by the operator prior to taking measurements, such as by way of input/output device 120.

With respect to controller system 128, controller system is configured for: (a) receiving the at least one operative condition signal; (b) determining at least one operative parameter based at least in part on the at least one operative condition signal, the at least one operative parameter being associated with a performance of the baler; and (c) outputting the at least one operative parameter to an output device, such as device 120 or any other output device forming a part of control system 129. All actions performed by sensors 137, 138 and controller system 128 can be done automatically.

Regarding (b), the at least one operative parameter can include, by way of example and not limitation, the at least one operative condition, a comparison of the at least one operative condition to a standard, a statistical analysis, and/or a sale price. Regarding the at least on operative condition, controller can recognize the operative condition(s) for the operative parameter(s). That is, the values of the measurements taken of each of diameter 347, width 348, height 349, width 450, height 451, width 452 for each bale 110, and/or height 453 can be output to device 120 in an organized and understandable way to user. Optionally, for each bale 110, when a plurality of measurements are taken for any of 347, 348, 349, 450, 451, 452, and/or 453, an average of the plurality of the respective one of 347, 348, 349, 450, 451, 452, and/or 453 can be calculated and output to the user. Optionally, the values of the measurements of each of 347, 348, 349, 450, 451, 452, and/or 453 can be used to form illustrations of respective bales 110, thereby displaying pictorially a bale shape to user. Optionally, a plurality of bales 110—for example but not by way of limitation, the bales 110 for a given field—can be averaged or otherwise summarized with respect to the values of 347, 348, 349, 450, 451, 452, and/or 453 to give a more generalized understanding of the condition of bales 110 in terms of 347, 348, 349, 450, 451, 452, and/or 453 and bale shape, which can aid in developing an assessment of a set of bales 110 and/or in understanding the overall value of a set of bales 110 of a given field for example, as well as assessing and/or in understanding the performance of baler 101 under a given set of conditions (i.e., weather, field conditions, crop conditions, tractor and baler make and model, tractor and/or baler settings). All of the data obtained by sensors 137, 138 can be stored in controller system 128. Further, optionally, the location of bales 110 in the field can be ascertained and stored in controller system 128. For example. The onboard GPS's of tractor 100 and/or baler 101 can be used to ascertain the respective location of tractor 100 and/or baler 101, and sensor(s) 137, 138, or another sensor, can be used to determine, for instance, a distance to and, optionally, a direction to a respective bale 110 from tractor 100 and/or baler 101, which can be correlated with a GPS position of the respective bale 110 and stored in controller system 128. Regarding the comparison, controller system 128 can compare each bale 110 and/or a predetermined plurality of bales 110 to a reference or standard bale. In so doing, bales 110 from a given field, for example, can be assessed in terms of how deficient they are with respect to the standard bale. Regarding statistical analysis, controller system 128 can be configured to perform statistical calculations with respect to bale appearance and/or baler performance. For example, the likelihood that a bale will appear in a certain way under certain conditions (i.e., weather, field conditions, crop conditions, tractor and baler make and model, tractor and/or baler settings) may be calculated. These calculations can be based on any predetermined sampling size, for example all, or less than all, the bales in a given field, and the sampling size can be supplemented and the calculations can be enhanced from historical data, i.e., past measurements of 347, 348, 349, 450, 451, 452, and/or 453; such historical data can be stored in the data center associated with control system 140. Regarding sale price, having the aforementioned data and calculations associated with 347, 348, 349, 450, 451, 452, and/or 453, controller system 128 can calculate a sale price for any given bale 110 or set of bales 110. To make this calculation of the sale price, controller system 128 can have access to market information upon which to base a sale price for bale(s) 110. In sum, controller system

128 includes software application for, among other things, ascertaining bale shape, measuring the degree of conformity of bales 110 to the standard, recording sample populations in a database, and providing statistical analysis of the baler's performance.

Referring again to FIG. 2, an additional embodiment of the present invention is now described. The primary difference to what has been described above are sensors 137A and 137B, which can be used in the alternative to or in addition to sensor 137. Sensors 137A, 137B are substantially similar to sensor 137, except as described. For instance, like sensor 137, sensors 137A, 137B each can be an optical or visual sensor, such as a camera, a lidar sensor, and/or a radar sensor. Further, like sensor 137, each sensor 137A, 137B is configured for: (a) detecting remotely at least one operative condition (i.e., bale dimension(s)) of a bale 110 of crop material 136 after the bale 110 has been ejected from bale chamber 109 of baler 101; and (b) outputting at least one operative condition signal corresponding to the at least one operative condition. Sensors 137A can be positioned generally at the lateral sides of baler, such as on the external skin of baler 101 and on a top wall, a side wall, or a rear wall of baler 101. Each sensor 137 can be pointed or otherwise aimed (so as to see) rearwardly of baler 101, and sensors 137A, 137B can be angled inwardly, that is, somewhat towards a longitudinal center line of baler 101, such that sensors 137A, 137B point both rearwardly and inwardly, as indicated by the arrows extending from sensors 137A, 137B, respectively. Thus, as bale 110-1 ejects from bale chamber 109 and/or after bale 110-1 comes to rest on the ground after ejection, each sensor 137A, 137B is configured to sense at least a portion of bale 110-1, such as left and right halves (that is, longitudinal halves) of bale 110-1 (as viewed in FIG. 2) or overlapping portions of bale 110-1. In so sensing, each sensor 137A, 137 can, for example, take a photograph or video of bale 110-1. In this way, sensors 137A, 137B senses only respective portions of bale 110-1, such as partial images of bale 110-1. After controller system 128 (such as controller 123) receives what is sensed (i.e., the images sensed), controller system 128 is configured for integrating the partial images of bale 110-1 received from sensors 137A, 137B into a composite image, in order to perform any of the other functions of controller 128 described above, such as evaluation of bale 110-1.

In use, an operator of tractor 100 and baler 101 can bale crop material 136 in a field. Upon ejecting a bale 110, sensors 137, 137A, 137B can obtain measurements of the aforedescribed dimensions of side X of bale. Upon harvesting a windrow 239 of a subsequent row of crop material 136, such as the next adjacent row, sensor 138 can obtain measurements of the aforedescribed dimensions of side Y of bale. This can be done for multiple bales 110 of a field. Controller system 128 can make the determinations as described above and output the determined information for a user to see or otherwise use.

Referring now to FIG. 5, there is shown schematically a top view of an agricultural system 535, according to another exemplary embodiment of the present invention. All prior reference numbers with respect to agricultural system 135 are increased by a multiple of 100 and are substantially similar to the structures and function described and shown with respect to FIGS. 1-4, unless otherwise shown and/or described differently with respect to FIG. 5. Agricultural system 535 is formed as or includes a handheld device 501 (not a baler), which can be formed as a smartphone 501, as schematically indicated in FIG. 5. System 535 is shown in FIG. 5 to include device 501 and control system 529.

Device 501 includes a frame 530 and sensor 537. Further, device 501 includes, at least in part, control system 529 and device 520. Sensor 537 can perform the functions of sensors 137, 138. Thus, sensor is configured for: detecting remotely at least one operative condition of bale 110 of crop material 136 after bale 110 has been ejected from bale chamber 109 of baler 101; and outputting, to controller system 528, at least one operative condition signal corresponding to the at least one operative condition. The at least one operative condition can be as described above, namely, dimensions 347, 348, 349, 450, 451, 452, and/or 453. A user can hold device 501 and, by way of sensor 537, detect the aforedescribed dimensions associated with side X (as shown in FIG. 5) and also the aforedescribed dimensions of side Y. When doing so, bales 110 can be lying in the field, as in FIG. 2, or can be in any other place where user can access sides X and/or Y of bale 110 with device 501, such as in a barn, on a trailer, stacked on a surface, or the like. The location of bales so measured can also be ascertained by way of a GPS of device 501 and a distance to and, optionally, a direction to bale 110 obtained by sensor 537.

Control system 529 is operatively coupled with frame 530. Control system 529 includes controls systems 522 and 140 and includes controller system including controllers 523, 141. Control system 522, 140 includes respectively controllers 523, 141, processor(s) 524, 142, memory 525, 143, data 526, 144, and instructions 527, 145, control system 523 being substantially similar to control system 123. Controller system 528 is operatively coupled with sensor 537 and is configured for: receiving the at least one operative condition signal; determining at least one operative parameter based at least in part on the at least one operative condition signal, the at least one operative parameter being associated with a performance of the baler. As described above, the at least one operative parameter includes, for example, the at least one operative condition, a comparison of the at least one operative condition to a standard, a statistical analysis, and/or a sale price.

In use, a user can hold device 501 in the hand. In so doing, user can aim device 501 at side X or side Y of a bale 110 and obtain the measurements of dimensions associated with the respective side X or side Y as described above. Then, user can aim device 501 at the other of side X or side Y of the same bale 110 and obtain the measurements of dimensions associated with the respective side X or side Y as described above. Controller system 528 can make the determinations as described above and output the determined information for user to see or otherwise use. User can take these measurements of a plurality of bales 110 to obtain a predetermined sample size, thereby further enhancing the data and the determinations made and output by controller system 528.

Figure 6:
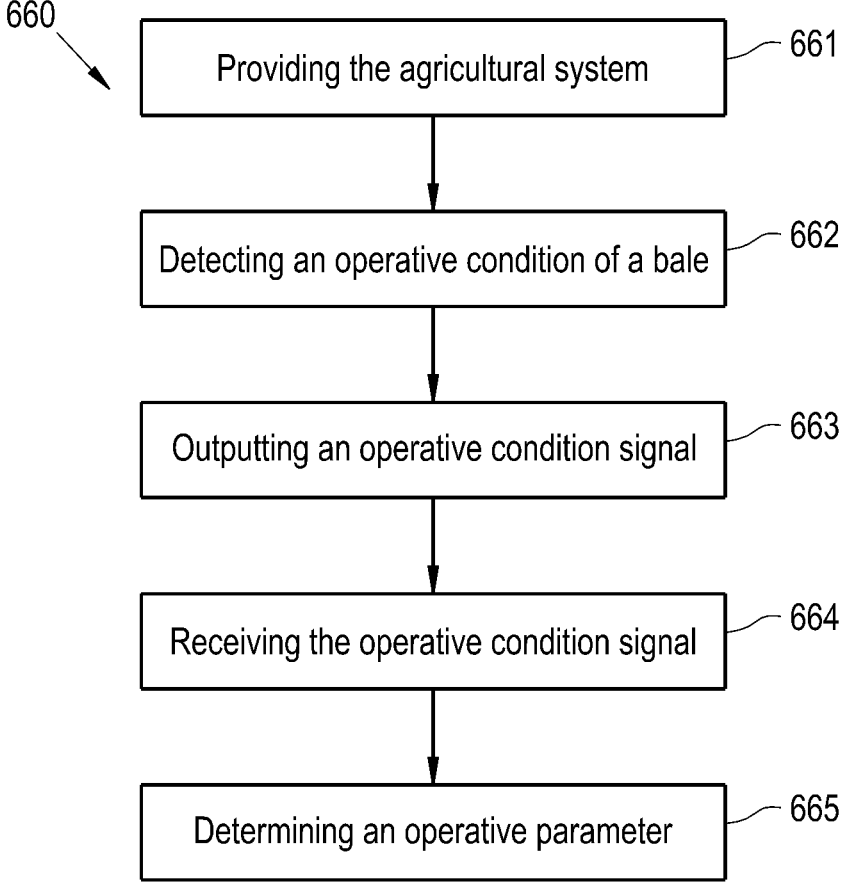
FIG. 6 illustrates a flow diagram showing a method of using the agricultural system, in accordance with an exemplary embodiment of the present invention.

Referring now to FIG. 6, there is shown a flow diagram showing a method 660 of using an agricultural system 135, 535, the method 660 including the steps of: providing 661 that the agricultural system 135, 535 includes a frame 104, 130, 530 and a control system 129, 529 operatively coupled with the frame 104, 130, 530, the control system 129, 529 including at least one sensor 137, 138 and a controller system 128, 528 operatively coupled with the at least one sensor 137, 138; detecting 662 remotely, by the at least one sensor 137, 138, 137A, 137B, at least one operative condition 347, 348, 349, 450, 451, 452, and/or 453 of a bale 110 of a crop material 136 after the bale 110 has been ejected from a bale chamber 109 of a baler 101; outputting 663, by the at least one sensor 137, 138, 137A, 137B, at least one operative condition signal corresponding to the at least one operative condition 347, 348, 349, 450, 451, 452, and/or 453; receiving 664, by the controller system 128, 528, the at least one operative condition signal; and determining 665, by the controller system 128, 528, at least one operative parameter based at least in part on the at least one operative condition signal, the at least one operative parameter being associated with a performance of the baler 101. Further, the at least one operative condition (347, 348, 349, 450, 451, 452, and/or 453) can include at least one bale dimension. Further, the at least one operative parameter can include the at least one operative condition 347, 348, 349, 450, 451, 452, and/or 453, a comparison of the at least one operative condition 347, 348, 349, 450, 451, 452, and/or 453 to a standard, a statistical analysis, and/or a sale price. Further, the agricultural system 135 further includes the baler 101 which includes the frame 130 and, at least in part, the control system 129. Further, the agricultural system 535 further includes a handheld device 501 which includes the frame 530 and, at least in part, the control system 529.

It is to be understood that the steps of method 660 are performed by controller 115, 123, 141, 523 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123, 141, 523 described herein, such as the method 660, is implemented in software code or instructions which are tangibly stored on a tangible computer readable medium. The controller 115, 123, 141, 523 loads the software code or instructions via a direct interface with the computer readable medium or via a wired and/or wireless network. Upon loading and executing such software code or instructions by controller 115, 123, 141, 523, controller 115, 123, 141, 523 may perform any of the functionality of controller 115, 123, 141, 523 described herein, including any steps of the method 660.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A control system of an agricultural system, the agricultural system including a frame, the control system being operatively coupled with the frame, the control system comprising:

(a) at least one sensor configured for:

detecting remotely (i) a bale of a crop material lying on a ground surface and (ii) at least one operative condition of the bale lying on the ground surface, wherein the at least one operative condition includes at least one bale dimension of the bale lying on the ground surface; and outputting at least one operative condition signal corresponding to the at least one operative condition;

(b) a controller system operatively coupled with the at least one sensor and configured for:

receiving the at least one operative condition signal; and determining at least one operative parameter based at least in part on the at least one operative condition signal, the at least one operative parameter being associated with a performance of a baler, wherein the sensor is at least one camera mounted to a frame of the baler and the camera is pointed in a direction away from the baler for detecting the bale on the ground surface.

2. The control system of claim 1, wherein the at least one operative parameter includes at least one of the at least one operative condition, a comparison of the at least one operative condition to a standard, a statistical analysis, and a sale price.

3. The control system of claim 2, wherein the control system is configured for being at least a part of the baler which includes the frame.

4. The control system of claim 2, wherein the control system is configured for being at least a part of a handheld device which includes the frame.

5. The control system of claim 1, wherein remotely detecting the bale is based on a shape of the bale lying on the ground surface.

6. The control system of claim 1, wherein the control system further comprises a global positioning system (GPS) that is employed in combination with the sensor for determining a location of the bale lying on the ground surface.

7. The control system of claim 1, wherein the at least one camera comprises a first camera pointed in a direction that is rearward of the baler and a second camera that is pointed in a direction from one side of the baler.

8. The control system of claim 1, wherein the sensor is not in contact with the bale lying on the ground surface.

9. The control system of claim 1, wherein the at least one operative condition includes a width, height or diameter of the bale lying on the ground surface.

10. An agricultural system, comprising:

a frame;

a control system operatively coupled with the frame, the control system including:

at least one sensor configured for:

(a) detecting remotely (i) a bale of a crop material lying on a ground surface and (ii) at least one operative condition of the bale lying on the ground surface, wherein the at least one operative condition includes at least one bale dimension of the bale lying on the ground surface; and (b) outputting at least one operative condition signal corresponding to the at least one operative condition;

a controller system operatively coupled with the at least one sensor and configured for:

(a) receiving the at least one operative condition signal; and (b) determining at least one operative parameter based at least in part on the at least one operative condition signal, the at least one operative parameter being associated with a performance of a baler, wherein the sensor is at least one camera mounted to a frame of the baler and the camera is pointed in a direction away from the baler for detecting the bale on the ground surface.

11. The agricultural system of claim 10, wherein the at least one operative parameter includes at least one of the at least one operative condition, a comparison of the at least one operative condition to a standard, a statistical analysis, and a sale price.

12. The agricultural system of claim 11, further including the baler which includes the frame and, at least in part, the control system.

13. The agricultural system of claim 11, further including a handheld device which includes the frame and, at least in part, the control system.

14. A method of using an agricultural system, the method comprising the steps of:

providing that the agricultural system includes a frame and a control system operatively coupled with the frame, the control system including at least one sensor and a controller system operatively coupled with the at least one sensor;

detecting remotely, by the at least one sensor, (i) a bale of a crop material lying on a ground surface and (ii) at least one operative condition of the bale lying on the ground surface, wherein the at least one operative condition includes at least one bale dimension of the bale lying on the ground surface;

outputting, by the at least one sensor, at least one operative condition signal corresponding to the at least one operative condition;

receiving, by the controller system, the at least one operative condition signal; and determining, by the controller system, at least one operative parameter based at least in part on the at least one operative condition signal, the at least one operative parameter being associated with a performance of a baler, wherein the sensor is at least one camera mounted to a frame of the baler and the camera is pointed in a direction away from the baler for detecting the bale on the ground surface.

15. The method of claim 14, wherein the at least one operative parameter includes at least one of the at least one operative condition, a comparison of the at least one operative condition to a standard, a statistical analysis, and a sale price.

16. The method of claim 15, wherein the agricultural system further includes the baler which includes the frame and, at least in part, the control system.

17. The method of claim 15, wherein the agricultural system further includes a handheld device which includes the frame and, at least in part, the control system.

* * * * *